United States Patent
Hong et al.

(10) Patent No.: US 8,634,883 B2
(45) Date of Patent: Jan. 21, 2014

(54) DOCKING APPARATUS FOR PORTABLE DEVICE

(75) Inventors: Seok-won Hong, Seoul (KR); Chae-joo Son, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 12/916,674

(22) Filed: Nov. 1, 2010

(65) Prior Publication Data

US 2011/0117833 A1    May 19, 2011

(30) Foreign Application Priority Data

Nov. 17, 2009  (KR) .................. 10-2009-0110717

(51) Int. Cl.
*H04M 1/00*  (2006.01)
*H04B 1/38*  (2006.01)

(52) U.S. Cl.
USPC ...................... 455/575.1; 455/90.3

(58) Field of Classification Search
USPC ............. 455/3.06, 550.1, 575.1, 569.1, 572, 455/573, 90.3, 66.1; 439/529
See application file for complete search history.

(56) References Cited

U.S. PATENT DOCUMENTS 7,524,197 B2 *   4/2009  Mills et al. .................... 439/131
2007/0213092 A1 *  9/2007  Geelen ....................... 455/556.1

* cited by examiner

*Primary Examiner* — Eugene Yun
(74) *Attorney, Agent, or Firm* — Sughrue Mion, PLLC

(57) ABSTRACT

A docking apparatus for a portable device includes: a mounting unit on which the portable device is to be mounted; a connection terminal disposed in the mounting unit and configured to connect with a connector of the portable device; a terminal support unit which is rotatable with respect to the mounting unit and supports the connection terminal; and a rotation unit which is coupled to the terminal support unit and rotates the connection terminal within a predetermined rotational angle range.

23 Claims, 9 Drawing Sheets

DOCKING APPARATUS FOR PORTABLE DEVICE

CROSS-REFERENCE TO RELATED APPLICATION

This application claims priority from Korean Patent Application No. 10-2009-0110717, filed on Nov. 17, 2009 in the Korean Intellectual Property Office, the disclosure of which is incorporated herein by reference.

BACKGROUND

1. Field

Apparatuses and methods consistent with the exemplary embodiments relate to a docking apparatus on which portable devices having different shapes and sizes can be mounted.

2. Description of Related Art

A portable device, for example, may include a portable digital media player such as an MP3 player, a video player or a cellular phone.

Such a portable device generally includes a chargeable battery, and is provided with a separate docking apparatus for charging the battery of the portable device or for data communication with the portable device. The docking apparatus is supplied with external power in a normal state and is connected with a computer or the like. Thus, a user can mount the portable device on the docking apparatus for charging or data communication.

Recently, portable device manufacturers have provided portable devices having a variety of shapes and sizes to meet a variety of consumer's demands. Thus, it is required to develop a docking apparatus which can be conveniently adapted to the portable devices having different shapes and sizes.

SUMMARY

An aspect of an exemplary embodiment provides a docking apparatus which can be conveniently adapted to portable devices having different shapes and sizes.

According to an aspect of an exemplary embodiment, there is provided with a docking apparatus for a portable device, including: a mounting unit on which the portable device is to be mounted; a connection terminal which is installed in the mounting unit to be connected with a connector of the portable device; a terminal support unit which is rotatable with respect to the mounting unit and supports the connection terminal; and a rotation unit which is coupled to the terminal support unit and rotates the connection terminal within a predetermined rotational angle range.

The mounting unit may include a base support which supports a bottom portion of the portable device; and a side support extends upwardly from a side of the base support to support a side portion of the portable device.

The terminal support unit may include a terminal support part which supports the connection terminal; and a hinge part which rotatably connects the terminal support part to the mounting unit.

The rotation unit may include a rotational elastic member which is coupled to the terminal support unit and elastically rotates the terminal support part towards the side support of the mounting unit by a predetermined angle.

The docking apparatus may further include a rotational angle restricting unit which restricts a rotational angle of the terminal support part.

The rotational angle restricting unit may include a locking unit which stops the rotation of the terminal support part when the terminal support part rotates by a predetermined angle in a direction away from the side support of the mounting unit.

The locking unit may include a locking protrusion which is provided to lock the rotation of the terminal support part; and a locking elastic member which elastically biases the locking protrusion to lock the rotation of the terminal support part, and releases a locking state of the locking protrusion to allow the rotation of the terminal support part towards the side support of the mounting unit when an external force greater than an elastic force of the rotational elastic member is applied to the terminal support part.

The rotational angle restricting unit may include a stopper which restricts a rotational angle of the terminal support part when the terminal support part rotates towards the side support of the mounting unit.

The terminal support part may include an opening, and wherein a portion of the terminal support part is exposed through the opening wherein the connection terminal can be rotated.

The mounting unit may include a wireless transmitting unit which transmits media data stored in the portable device through wireless communication.

The mounting unit may further include an amplifying unit which amplifies an audio signal transmitted from the portable device and transmits the amplified audio signal to the wireless transmitting unit.

The docking apparatus may further include a battery for supplying electric power to the portable device to be mounted on the mounting unit.

The docking apparatus may further include a mounting unit support which supports the mounting unit, the mounting unit support including an external power connector for connection with an external power source.

The mounting unit and the mounting unit support may each include respective power terminals for supplying the electric power inputted to the mounting unit support to the mounting unit.

The docking apparatus may further include a mounting unit support which supports the mounting unit and has an external power connector for connection with an external power source.

The mounting unit and the mounting unit support may be integrally provided, and external power inputted through the external power connector of the mounting unit support may be supplied to the portable device mounted on the mounting unit.

According to an aspect of an exemplary embodiment, there is provided a docking apparatus for a portable device including a mounting unit on which the portable device is to be mounted; a terminal support unit rotatably supported by the mounting unit; and a connection terminal installed on the terminal support unit to be connected with a connector of the portable device.

The mounting unit may include a base support which supports a bottom portion of the portable device and a side support which extends upwardly from a side of the base support to support a side portion of the portable device.

The terminal support unit may be housed within the base support of the mounting unit.

The connection terminal may extend substantially in parallel to the side support.

The terminal support unit may bias the connection terminal in a direction toward the side support.

The docking apparatus may include a rotational angle restriction member that prevents the terminal support unit from rotating beyond a predetermined angle in a direction opposite to the direction toward which the terminal support unit biases the connection terminal.

BRIEF DESCRIPTION OF DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
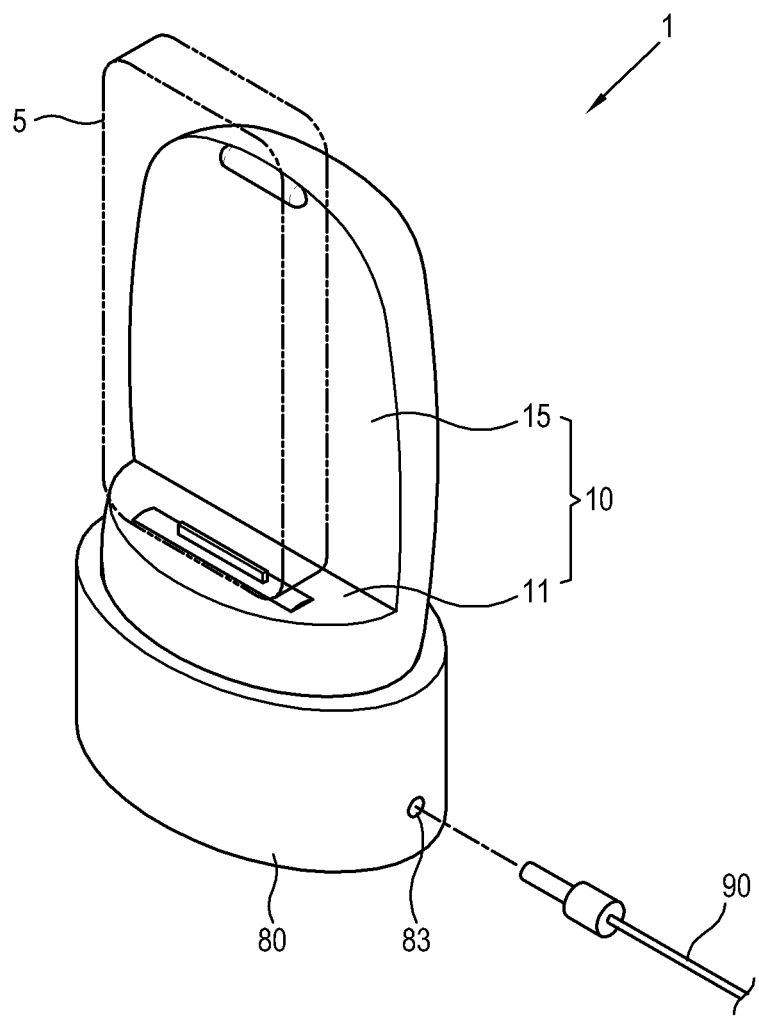
FIG. 1 is a schematic perspective view illustrating a docking apparatus for a portable device according to an exemplary embodiment.

Reference will now be made in detail to the exemplary embodiments, examples of which are illustrated in the accompanying drawings, wherein like reference numerals refer to like elements throughout. The exemplary embodiments are described below so as to explain the inventive concept by referring to the figures. Redundant description to different exemplary embodiments may be omitted for simplicity of description.

As shown in FIGS. 1 to 6, a docking apparatus 1 for a portable device according to an exemplary embodiment includes: a mounting unit 10 on which a portable device 5 is mounted and supported; a connection terminal 25 which is installed in the mounting unit 10 to be connected to a connector 7 of the portable device 5; a terminal support unit 30 which is installed to rotate with respect to the mounting unit 10 and supports the connection terminal 25; and a rotation unit 50 which is coupled to the terminal support unit 30 and elastically rotate the connection terminal 25.

The portable device 5 may be provided, for example, as an MP3 player, or any other digital media player such as a portable video player or cellular phone. The portable device 5 has at a bottom thereof the connector 7 which is supplied with external power and communicates digital media data such as an audio signal with external devices.

Figure 2:
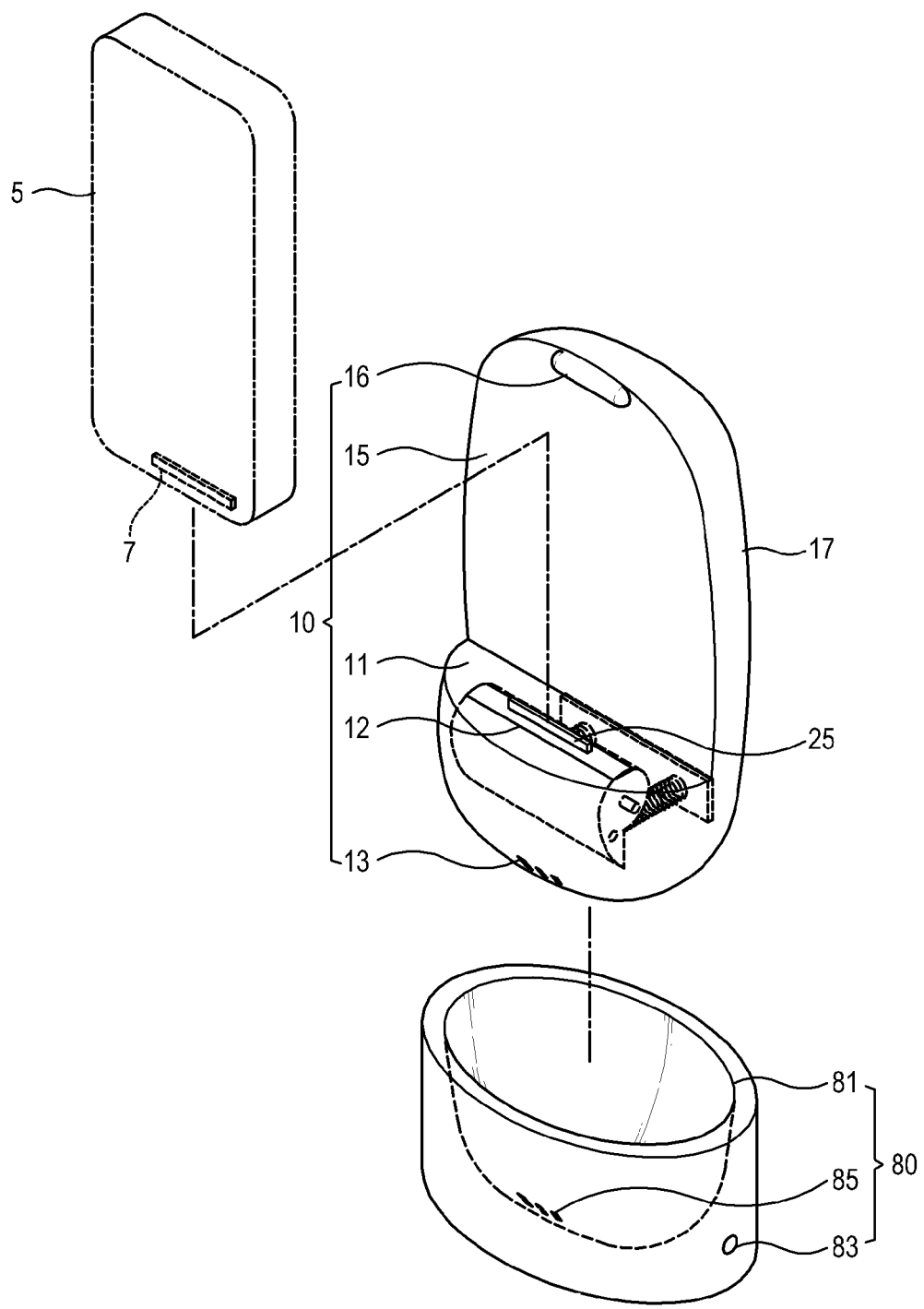
FIG. 2 is an exploded perspective view illustrating the docking apparatus in FIG. 1.

As shown in FIGS. 1 and 2, the mounting unit 10 includes a base support 11 which supports a bottom portion of the portable device 5; and a side support 15 which extends upwards from a side of the base support 11 to support a side portion of the portable device 5. The mounting unit 10 may be configured so that a user can easily grasp the mounting unit 10 with one hand with the portable device 5 being mounted on the mounting unit 10.

The base support 11 may have approximately a planar upper surface. In the upper surface of the base support 11 is formed an opening 12 through which the connection terminal 25 may be protruded. Further, part of the terminal support part 31 of the terminal support unit 30 may be housed in the base support 11 and exposed through the opening 12. The base support 11 may be accommodated in a mounting unit support 80 to be described later. The base support 11 may be provided with a power terminal 13 which is configured to be accommodated in the mounting unit support 80 and contacts a power terminal 85 of the mounting unit support 80 to be supplied with electric power through the mounting unit support 80.

The side support 15 may have a length shorter than that of the portable device 5 so that the portable device 5 mounted on the base support 11 can be easily supported on the side support 15. Alternatively, the length of the side support 15 may be longer than that of the portable device 5 as necessary. On an upper part of the side support 15 may be provided a contact member 16 for supporting the portable device 5. In order to elastically and smoothly support the portable device 5, the contact member 16 may be made of an elastic material such as rubber. A rear part 17 of the side support 15 may be formed approximately flat, so as to be stably seated on an installation surface such as a table. The connection terminal 25 may extend substantially parallel to the side support 15.

Figure 6:
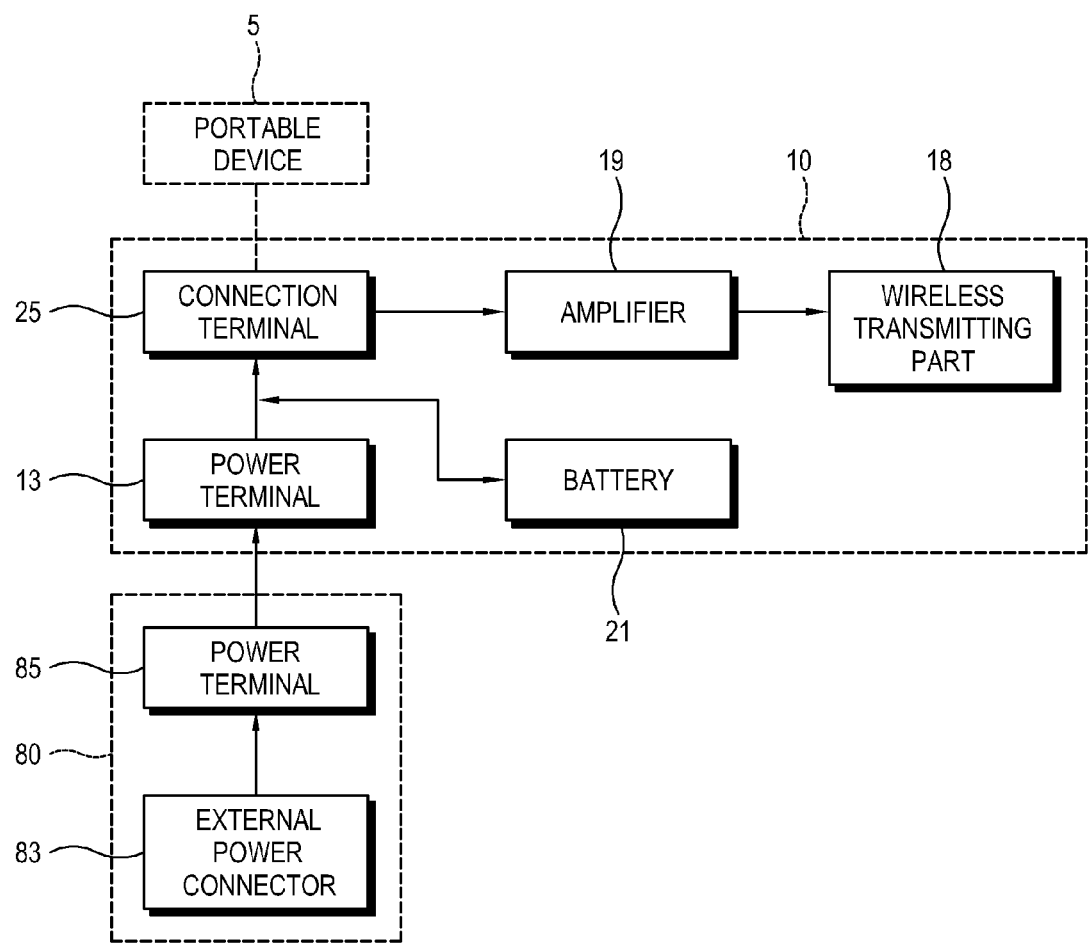
FIG. 6 is a block diagram illustrating a docking apparatus for a portable device according to an exemplary embodiment.

As shown in FIG. 6, the mounting unit 10 may be provided with a wireless transmitting part 18 for wirelessly transmitting digital media data such as an audio signal stored in the portable device 5 to an external output device (not shown) such as a speaker. In the case where the mounting unit 10 is provided with the wireless transmitting part 18, the external output device such as a speaker may be provided with a receiving part for receiving the audio signal transmitted from the wireless transmitting part 18. The wireless transmitting part 18 may employ RF (radio frequency) communication, Wi-Fi communication, Bluetooth communication, or the like. Further, the mounting unit 10 may be provided with a receiving part (not shown) for receiving digital media data from external devices, for example, in a wireless manner.

Further, the mounting unit 10 may be provided with an amplifier 19 which amplifies the audio signal transmitted from the portable device 5 and transmits the amplified signal to the wireless transmitting part 18. Thus, even though the output of the audio signal transmitted from the portable device 5 is weak, the amplifier 19 may amplify the audio signal to transmit the amplified signal to the external output device through the wireless transmitting part 18, thereby providing optimized sound. Alternatively, the amplifier 19 may be provided in the external output device, not in the mounting unit 10.

According to an exemplary embodiment, the mounting unit 10 may be mounted with a battery 21 for supplying electric power to the portable device 5. In the case where the portable device 5 is mounted on the mounting unit 10, the portable device 5 may use, as a power source, a battery mounted in the portable device 5 or the battery 21 mounted in the mounting unit 10. For example, in the case where the battery (not shown) mounted in the portable device 5 is discharged out, the battery 21 mounted in the mounting unit 10 may be used as an auxiliary power source. The battery 21 mounted in the mounting unit 10 may be a chargeable battery or a non-chargeable or disposable battery. Alternatively, the mounting unit 10 may be provided with no battery. In this case, the weight of the mounting unit may be decreased.

The connection terminal 25 is protruded to be easily connected to the connector 7 of the portable device 5. The connection terminal 25 is connected to the connector 7 of the portable device 5 so as to allow power supply to the portable device 5 and data communication with the portable device 5. Specifically, the connection terminal 25 is connected to the connector 7 of the portable device 5 so as to allow electric power supply of the battery 21 mounted in the mounting unit 10 or electric power supplied through the power terminal 13 of the mounting unit 10 to be supplied to the portable device 5. Further, the connection terminal 25 may be connected to the connector 7 of the portable device 5 so as to allow digital media data stored in the portable device 5 to be received and to allow digital media data to be transmitted to the portable device 5.

As shown in FIGS. 2 to 5, the terminal support unit 30 is rotatably installed in the base support 11 of the mounting unit 10 so that the connection terminal 25 can be exposed. The terminal support unit 30 includes the terminal support part 31 on which the connection terminal 25 is mounted, and a hinge part 33 which is installed on opposite sides of the terminal support part 31 to support the terminal support part 31 to rotate with respect to the mounting unit 10.

The terminal support part 31 may have a cylindrical shape. On an upper side of the terminal support part 31 is provided the connection terminal 25. As described above, part of the terminal support part 31 may be exposed through the opening 12 of the base support 11 so that the connection terminal 25 can be rotatably protruded through the opening 12. With the above configuration, the docking apparatus 1 may support the portable device 5 having different shapes and sizes, as long as the portable device 5 can be connected to the connection terminal 25.

The hinge part 33 includes a hinge shaft 35 which is installed on each side of the terminal support part 31, and a shaft accommodating part 38 which is provided to support the hinge shaft 35 in a rotatable manner. The shaft accommodating part 38 may be provided, for example, in a shaft support 37 which is disposed adjacent to each side of the terminal support part 31. The shaft support 37 may be provided in pairs inside of the base support 11 of the mounting unit 10 with the terminal support part 31 being interposed therebetween. Thus, the connection terminal 25 may rotate around a rotational axis A of the hinge part 33 together with the terminal support part 31.

Figure 3:
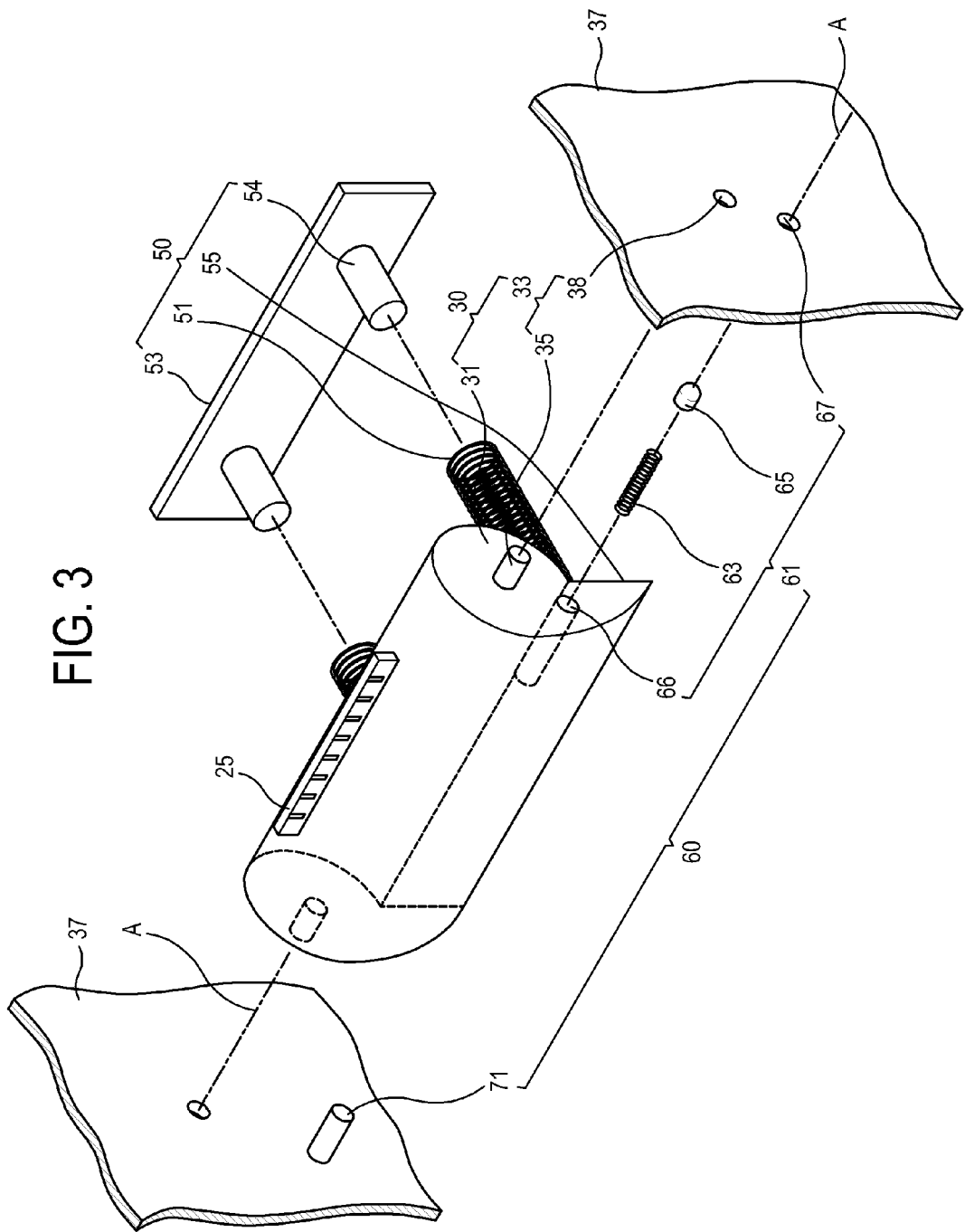
FIG. 3 is an exploded perspective view illustrating a terminal support unit and a rotation unit in the docking apparatus in FIG. 1.
Figure 4:
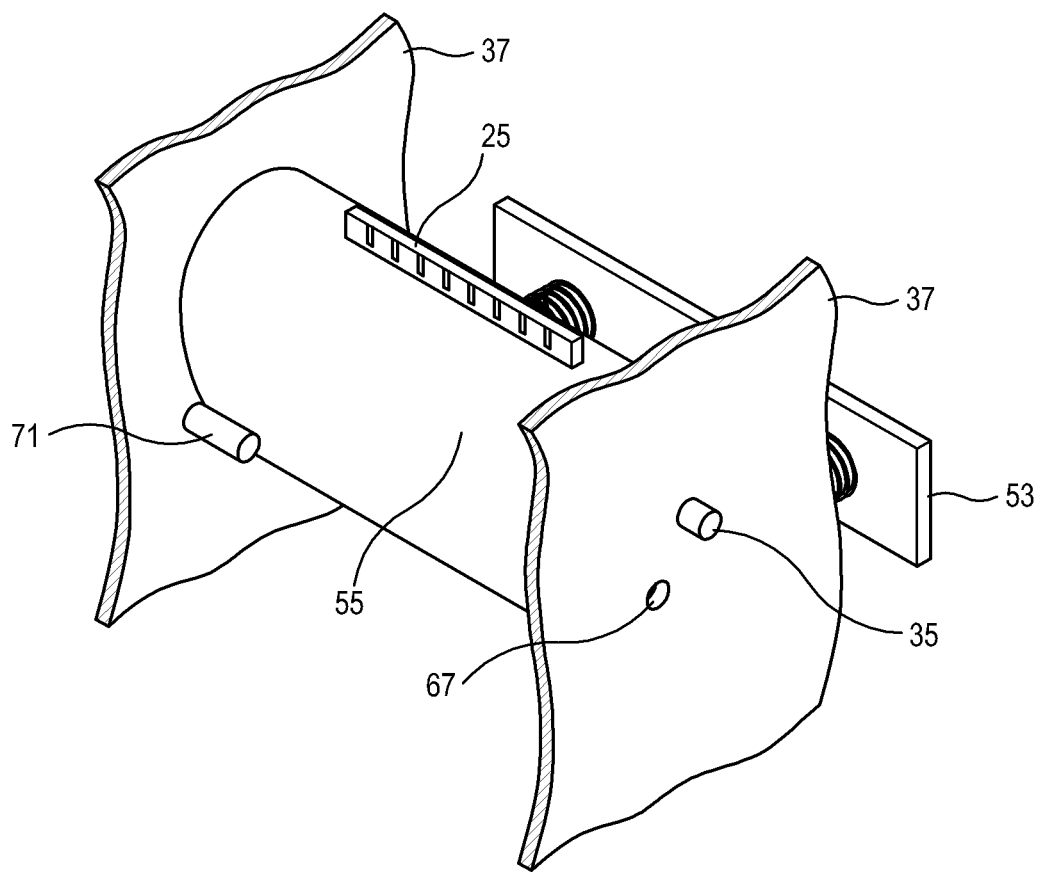
FIG. 4 is a perspective view illustrating the terminal support unit and the rotation unit of the docking apparatus in FIG. 1.

The rotation unit 50 is coupled to the terminal support part 30 to rotate the connection terminal 25 within a predetermined rotational angle range corresponding to the shape and size of the portable device 5 which is connected to the connection terminal 25. As shown in FIGS. 3 and 4, the rotational unit 50 includes a rotational elastic member 51 which is coupled to the terminal support unit 30 to elastically rotate the terminal support unit 30 towards the side support 15 by a predetermined angle. The rotational elastic member 51 may be provided, for example, as a coil spring, which is supported on an elastic member support 53 at one end part thereof and elastically presses a pressed member 55 extended from the terminal support part 31 at the other end part thereof. Alternatively, the rotational elastic member 51 may be provided as a torsion spring which is installed in the hinge part 33 to elastically bias the terminal support part 31 in one direction. In the present embodiment, the rotational elastic member 51 is provided in pairs, but the number thereof is not limited thereto, and for example, may be one, or three or more.

The elastic member support 53 is provided inside of the mounting unit 10 to support one end part of the rotational elastic member 51. According to the present exemplary embodiment, the elastic member support 53 may be provided with a support protrusion 54 which is coupled to one end part of the rotational elastic member 51 to prevent the rotational elastic member 51 from separating from the elastic member support 53.

The pressed member 55 is extended from one side of the terminal support part 31 to contact the other end part of the rotational elastic member 51. The pressed member 55 is eccentrically disposed with respect to the rotational axis A of the hinge part 33. Thus, the terminal support part 31 which is integrally formed with the pressed member 55 rotates around the rotational axis A of the hinge part 33 as the pressed member 55 is elastically pressed by the rotational elastic member 51.

Figure 5:
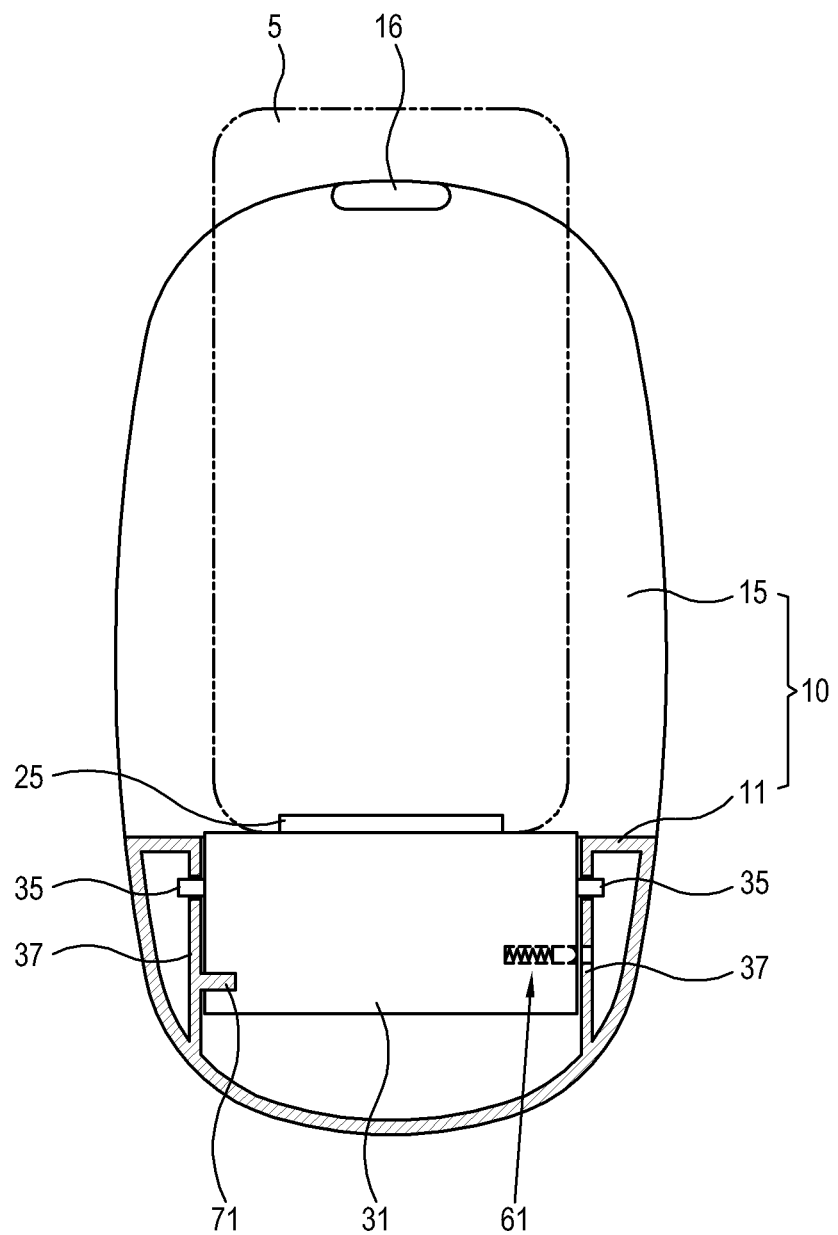
FIG. 5 is a section view illustrating the terminal support unit of the docking apparatus in FIG. 1.

Referring to FIGS. 3 to 5, the docking apparatus 1 according to an exemplary embodiment may further include a rotational angle restricting unit 60 for restricting the rotational angle of the terminal support unit 30.

The rotational angle restricting unit 60 may include a locking part 61 which locks the rotation of the terminal support unit 30 when the terminal support unit 30 rotates in a direction opposite to the side support 15 while overcoming the elastic force of the rotational elastic member 51. Further, the rotational angle restricting unit 60 may include a stopper 71 which restricts the rotational angle of the terminal support unit 30 when the terminal support unit 30 rotates towards the side support 15.

The locking part 61 includes a locking protrusion 65 for locking the rotation of the terminal support unit 30, and a locking elastic member 63 for elastically biasing the locking protrusion 65 to lock the rotation of the terminal support unit 30.

The locking protrusion 65 may be inserted into a locking unit accommodating recess 66 which is formed in at least one side of the terminal support part 31. The locking unit accommodating recess 66 may be lengthwise formed inside of the terminal support part 31 to accommodate the locking elastic member 63 and the locking protrusion 65. The locking protrusion 65 may be inserted into a protrusion accommodating recess 67 by an elastic force of the locking elastic member 63 at one side thereof to lock the rotation of the terminal support unit 30. The protrusion accommodating recess 67 may be provided in the shaft support 37 to accommodate the locking protrusion 65 when the terminal support unit 30 is located at a predetermined rotational angle. For example, the predetermined rotational angle when the locking protrusion 65 is inserted into the protrusion accommodating recess 67 may an angle when the connection terminal 25 rotates in the opposite direction to the side support 15 by about 10° from the position that the connection terminal 25 is parallel with the side support 15 with reference to the rotational axis A of the hinge part 33. The predetermined rotational angle may be varied within 3° to 15°, or may be smaller than 3° or larger than 15°, according to the shapes, sizes and the like of the portable device 5 and the mounting unit 10.

The locking elastic member 63 elastically biases the locking protrusion 65 to lock the rotation of the terminal support unit 30. The locking elastic member 63 may release the locking of the locking protrusion 65 when an external force larger than the elastic force of the rotational elastic member 51 is applied to the terminal support unit 30, so that the terminal support unit 30 can rotate towards the side support 15. To this end, one side of the locking protrusion 65 inserted into the protrusion accommodating recess 67 may be rounded to easily move out of the protrusion accommodating recess 67 by an external force. The locking elastic member 63 may be provided as a coil spring. The locking elastic member 63 may be accommodated in the locking unit accommodating recess 66 to outwardly push the locking protrusion 65. The locking elastic member 63 has such an elastic force that the locking protrusion 65 can move out of the protrusion accommodating recess 67 while overcoming the elastic force of the locking elastic member 63 when a predetermined external force is applied to push the terminal support unit 30 towards the side support 15. In this respect, the predetermined external force may be provided, for example, by one hand of a user.

The stopper 71 may be protruded from the shaft support 37 towards the terminal support part 31 to restrict the rotation of the terminal support part 31. Specifically, the stopper 71 is disposed on an opposite side of the pressed member 55 relative to the rotational elastic member 51, so as to restrict the rotation of the pressed member 55 when the connection terminal 25 rotates towards the side support 15. Alternatively, the stopper 71 may be installed on one side of the terminal support part 31 or the pressed member 55 to restrict the rotation of the connection terminal 25. A rotational angle of the terminal support unit 30 which is restricted by the stopper 71 may be an angle when the connection terminal 25 rotates by about 7° towards the side support 15 about the rotational axis A of the hinge part 33 from the position wherein the connection terminal 25 is parallel with the side support 15. Alternatively, the angle may be within 3° to 15°, or may be smaller than 3° or larger than 15° as necessary.

According to an exemplary embodiment, the docking apparatus 1 may rotate towards or away from the side support within a rotational angle range, for example, of 3° to 15° from the position wherein the connection terminal 25 is parallel with the side support 15.

As shown in FIGS. 1 and 2, the docking apparatus 1 may further include the mounting unit support 80 which supports the mounting unit 10 and includes the external power connector 83 for connection with an external power source.

The mounting unit support 80 may further include a mounting unit accommodating part 81 which accommodates therein a lower part of the mounting unit 10, and the power terminal 85 which is connected to the power terminal 13 of the mounting unit 10 to supply electric power inputted from the external power source through a cable 90 connected to the external power connector 83 to the mounting unit 10. The electric power supplied through the power terminal 13 of the mounting unit 10 may charge the battery 21 mounted in the mounting unit 10 or the battery of the portable device 5 mounted in the mounting unit 10.

According to an exemplary embodiment, the mounting unit 10 and the mounting unit support 80 may be integrally provided. In this case, the electric power inputted through the external power connector 83 may be directly supplied to the portable device 5 mounted on the mounting unit 10. Alternatively, the docking apparatus 1 may not include the mounting unit support 80. In this case, the external power connector 83 may be provided in the mounting unit 10.

An operational process of the docking apparatus 1 having the above-described configuration will be described with reference to FIGS. 7 and 8.

Figure 7:
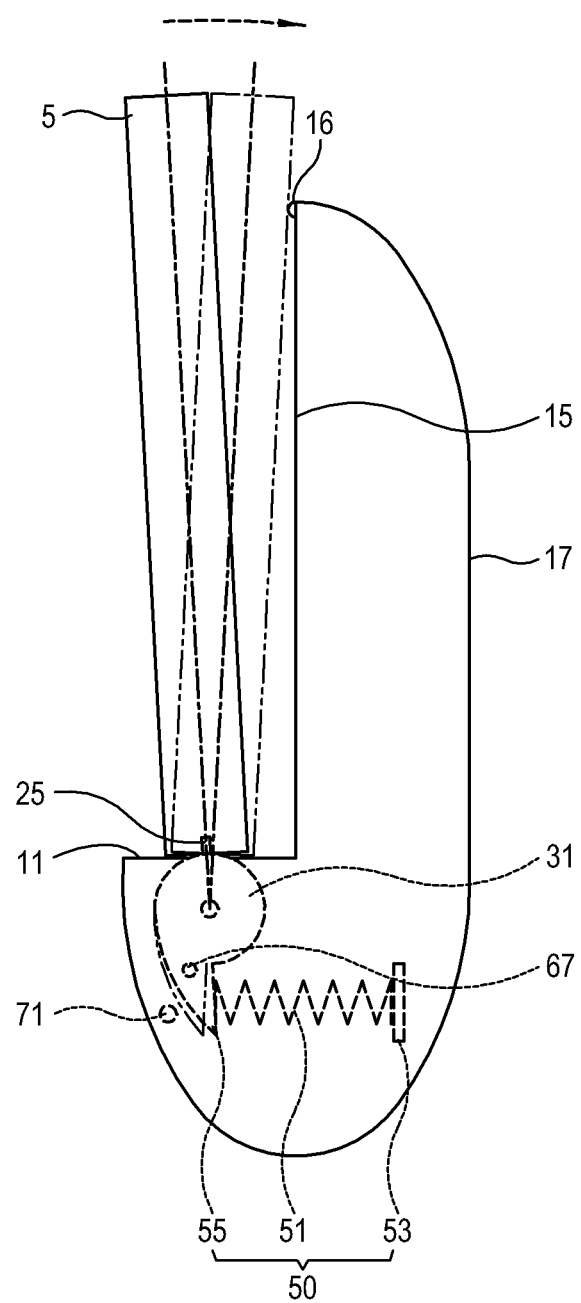
FIGS. 7 and 8 respectively illustrate operational states of a docking apparatus for a portable device according to an exemplary embodiment.
Figure 8:
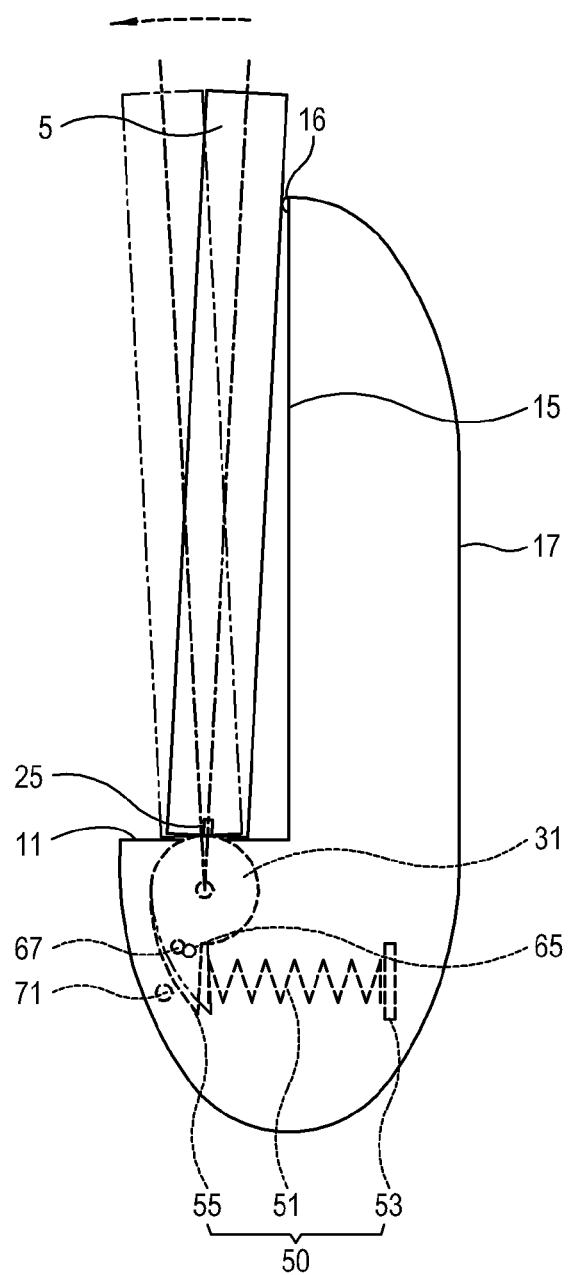

As shown in FIG. 7, the portable device 5 may be mounted on the docking apparatus 1 by a user. At this time, the connection terminal 25 provided in the mounting unit 10 rotates in the opposite direction relative to the side support 15, i.e., away from the side support 15, around the rotational axis A of the hinge part 33 and is placed in the locking state by means of the locking unit 61. In the locking state, since the connection terminal 25 is inclined to the left side in the FIG. 7, the user may easily connect the portable device 5 to the connection terminal 25. Then, the user may press the portable device 5 towards the side support 15 so that the portable device 5 can be supported on the side support 15. The user may apply a pressing force which can overcome the elastic force of the locking elastic member 63 so that the locking protrusion 65 can move out of the protrusion accommodating recess 67 to release the locking state. Then, the portable device 5 and the connection terminal 25 rotate towards the side support 15 around the rotational axis A by means of the rotation unit 50 to thereby contact the contact member 16 of the mounting unit 10.

In this way, the portable device 5 may be stably mounted on the mounting unit 10. That is, the portable device 5 may be mounted on the mounting unit 10 in an inclined manner by elastically contacting the contact member 16 by means of the rotation unit 50. Further, the user may grasp the portable device 5 which is stably mounted on the mounting unit 10 with his or her hand for convenient use. In addition, the mounting unit 10 which is being mounted with the portable device 5 may be mounted on the mounting unit support 80 to charge the battery of the portable device 5.

Hereinafter, a process of separating the portable device 5 from the docking apparatus 1 will be described with reference to FIG. 8. Firstly, the user pulls the portable device 5 in the opposite direction relative to the side support 15, i.e., away from the side support 15, with an external force larger than the elastic force of the rotational elastic member 51. Consequently, the portable device 5 and the connection terminal 25 rotate together in the opposite direction relative to the side support 15 around the rotational axis A of the hinge part 33. The portable device 5 and the connection terminal 25 stop the rotation by the locking unit 61 at a predetermined rotational angle. For example, if the portable device 5 and the connection terminal 25 rotate in the opposite direction relative to the side support 15 by 10°, for example, around the rotational axis A of the hinge part 33, the locking protrusion 65 of the locking unit 61 is accommodated in the protrusion accommodating recess 67 to lock the rotation. Then, the user may separate the portable device 5 from the connection terminal 25. In addition, the user may also separate the portable device 5 from the connection terminal 25 before the portable device 5 and the connection terminal 25 stop the rotation by means of the locking unit 61. In this case, the connection terminal 25 rotates towards the side support 15 by the rotation unit 50 by a rotational angle which is restricted by the stopper 71. Then, in order to connect the portable device 5 with the connection terminal 25 again, the user may rotate the connection terminal 25 in the opposite direction relative to the side support 15 to enter the locking state and may perform the process as described with reference to FIG. 7.

Figure 9:
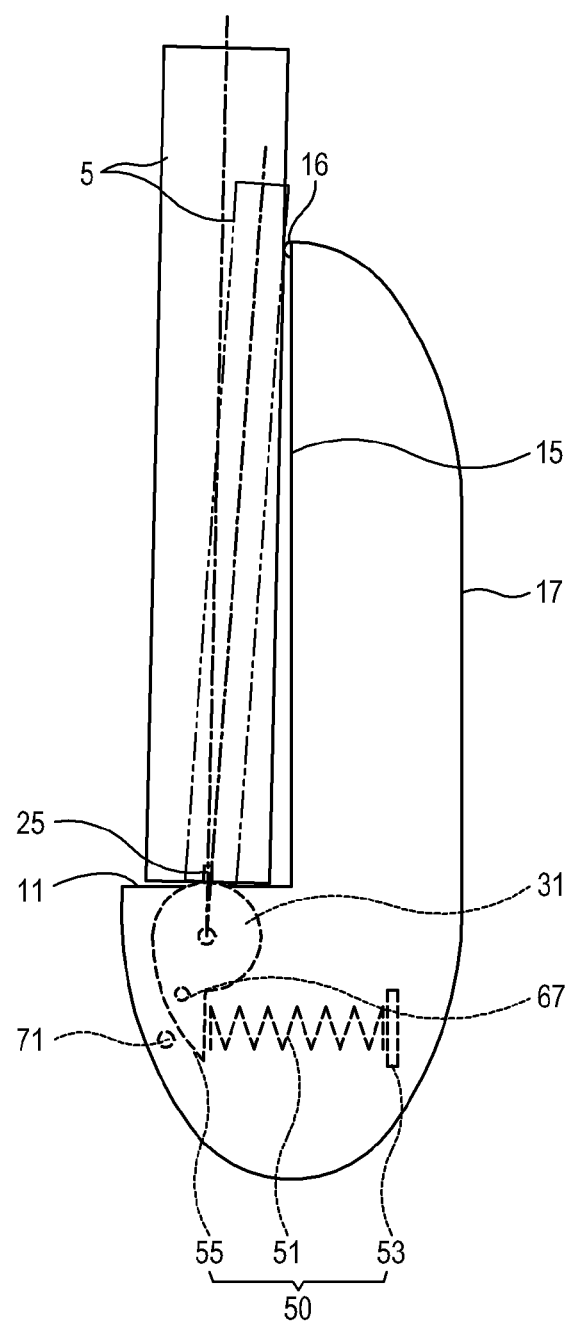
FIG. 9 illustrates a docking apparatus on which different portable devices are mounted according to an exemplary embodiment.

FIG. 9 illustrates a case that different portable devices 5 are mounted on a docking apparatus according to exemplary embodiment. For example, as shown in FIG. 9, the docking apparatus 1 may be selectively mounted with a plurality of portable devices 5 having different thicknesses. In this case, the relatively thick portable device 5 is connected with the connection terminal 25 at a small rotational angle as compared with the relatively thin portable device 5.

With such a configuration, the docking apparatus according to the exemplary embodiments may be conveniently adapted to portable devices having different shapes and sizes.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A docking apparatus for a portable device, comprising:
   a mounting unit on which the portable device is to be mounted;
   a mounting unit support which supports the mounting unit;
   a connection terminal disposed in the mounting unit and configured to connect with a connector of the portable device;
   a substantially cylindrical terminal support unit which is rotatable with respect to the mounting unit and supports the connection terminal; and
   a rotation unit which is coupled to the substantially cylindrical terminal support unit and rotates the connection terminal within a predetermined rotational angle range in the mounting unit support.

2. The docking apparatus according to claim 1, wherein the mounting unit comprises:
   a base support which supports a bottom portion of the portable device; and
   a side support which extends upwardly from a side of the base support to support a side portion of the portable device.

3. The docking apparatus according to claim 2, wherein the substantially cylindrical terminal support unit comprises:
   a terminal support part which supports the connection terminal; and
   a hinge part which rotatably connects the terminal support part to the mounting unit.

4. The docking apparatus according to claim 3, wherein the rotation unit comprises a rotational elastic member which is coupled to the substantially cylindrical terminal support unit and elastically rotates the terminal support part towards the side support of the mounting unit by a predetermined angle.

5. The docking apparatus according to claim 4, further comprising a rotational angle restricting unit which restricts a rotational angle of the terminal support part.

6. The docking apparatus according to claim 5, wherein the rotational angle restricting unit comprises a locking unit which stops the rotation of the terminal support part when the terminal support part rotates by a predetermined angle in a direction away from the side support of the mounting unit.

7. The docking apparatus according to claim 6, wherein the locking unit comprises:
   a locking protrusion which is provided to lock the rotation of the terminal support part; and
   a locking elastic member which elastically biases the locking protrusion to lock the rotation of the terminal support part, and releases a locking state of the locking protrusion to allow the rotation of the terminal support part towards the side support of the mounting unit when an external force greater than an elastic force of the rotational elastic member is applied to the terminal support part.

8. The docking apparatus according to claim 5, wherein the rotational angle restricting unit comprises a stopper which restricts a rotational angle of the terminal support part when the terminal support part rotates towards the side support of the mounting unit.

9. The docking apparatus according to claim 3, wherein the terminal support part comprises an opening, and wherein a portion of the terminal support part is exposed through the opening so that the connection terminal can be rotated.

10. The docking apparatus according to claim 1, wherein the mounting unit comprises a wireless transmitting unit which transmits media data stored in the portable device through wireless communication.

11. The docking apparatus according to claim 10, wherein the mounting unit further comprises an amplifying unit which amplifies an audio signal transmitted from the portable device and transmits the amplified audio signal to the wireless transmitting unit.

12. The docking apparatus according to claim 1, further comprising:
   a battery which supplies electric power to the portable device mounted on the mounting unit.

13. The docking apparatus according to claim 1,
   wherein the mounting unit comprising an external power connector that connects with an external power source, and
   wherein the mounting unit and the mounting unit support each comprise respective power terminals which supply the electric power input to the mounting unit support to the mounting unit.

14. The docking apparatus according to claim 1,
   wherein the mounting unit has an external power connector that connects with an external power source, and
   wherein the mounting unit and the mounting unit support are integrally provided, and external power inputted through the external power connector of the mounting unit support is supplied to the portable device mounted on the mounting unit.

15. A docking apparatus for a portable device, comprising:
   a mounting unit configured to receive the portable device;
   a substantially cylindrical terminal support unit rotatably supported by the mounting unit; and
   a connection terminal disposed on the substantially cylindrical terminal support unit and configured to connect with a connector of the portable device,
   wherein the mounting unit comprises:
     a base support which supports a bottom portion of the portable device; and
     a side support which extends upwardly from a side of the base support to support a side portion of the portable device, and
   wherein the substantially cylindrical terminal support unit biases the connection terminal in a direction toward the side support.

16. The docking apparatus according to claim 15, wherein the substantially cylindrical terminal support unit is disposed within the base support of the mounting unit.

17. The docking apparatus according to claim 15, wherein the connection terminal extends substantially parallel to the side support.

18. The docking apparatus according to claim 17, further comprising a rotational angle restriction member that prevents the substantially cylindrical terminal support unit from rotating beyond a predetermined angle in a direction opposite to the direction toward which the substantially cylindrical terminal support unit biases the connection terminal.

19. A docking apparatus for a portable device, comprising:
   a mounting unit on which the portable device is to be mounted;
   a terminal support unit being substantially cylindrical, wherein the terminal support unit comprises:
     hinge parts at base ends of the terminal support unit; and
     a connection terminal mounted to a surface of the terminal support unit between the base ends, wherein the connection terminal is configured to connect with a connector of the portable device; and
   a rotation unit coupled to the terminal support unit which rotates the terminal support unit about an axis of the terminal support unit.

20. The docking apparatus according to claim 19, wherein the mounting unit further comprises:
   a base support which supports a bottom portion of the portable device; and
   a side support which extends upwardly from a side of the base support to support a side portion of the portable device.

21. The docking apparatus according to claim 20, wherein the rotation unit further comprises a rotational elastic member which elastically rotates the terminal support unit towards the side support of the mounting unit by a predetermined angle.

22. The docking apparatus according to claim 19, further comprising a rotational angle restricting unit which restricts a rotational angle of the terminal support part.

23. The docking apparatus according to claim 22, wherein the rotational angle restricting unit comprises a locking unit which stops the rotation of the terminal support part when the terminal support part rotates by a predetermined angle in a direction away from the side support of the mounting unit.

* * * * *